United States Patent
Droege et al.

(10) Patent No.: US 9,969,096 B2
(45) Date of Patent: May 15, 2018

(54) DEVICE FOR CUTTING EXTRUDED PLASTICS PROFILES TO LENGTH

(71) Applicants: BATTENFELD-CINCINNATI GERMANY GMBH, Bad Oeyenhausen (DE); Joerg Droege, Kerken (DE); Christian von Hippel, Kempen (DE)

(72) Inventors: Joerg Droege, Kerken (DE); Christian von Hippel, Kempen (DE)

(73) Assignee: BATTENFELD-CINCINNATI GERMANY GMBH, Bad Oeyenhausen (DE)

( * ) Notice: Subject to any disclaimer, the term of this patent is extended or adjusted under 35 U.S.C. 154(b) by 17 days.

(21) Appl. No.: 15/028,727

(22) PCT Filed: Oct. 10, 2014

(86) PCT No.: PCT/EP2014/071806
§ 371 (c)(1),
(2) Date: Apr. 12, 2016

(87) PCT Pub. No.: WO2015/052329
PCT Pub. Date: Apr. 16, 2015

(65) Prior Publication Data
US 2016/0263761 A1  Sep. 15, 2016

(30) Foreign Application Priority Data

Oct. 12, 2013  (DE) .................. 10 2013 220 617

(51) Int. Cl.
*B23B 3/22*  (2006.01)
*B26D 3/16*  (2006.01)
(Continued)

(52) U.S. Cl.
CPC ................ *B26D 3/16* (2013.01); *B26D 1/58* (2013.01); *B26D 1/60* (2013.01); *B26D 5/08* (2013.01);
(Continued)

(58) Field of Classification Search
CPC .... B23B 5/14; B23B 5/16; B23B 3/22; B23B 3/26; Y10T 82/16; Y10T 82/16655;
(Continued)

(56) References Cited

U.S. PATENT DOCUMENTS 3,113,475 A * 12/1963 Lombardo ........ B23B 29/03471
408/152
4,430,913 A  2/1984 Williamson
(Continued)

FOREIGN PATENT DOCUMENTS

DE  20104200 U1  6/2001
DE  102007053476 A1  5/2009

*Primary Examiner* — Daniel Howell
*Assistant Examiner* — Nicole N Ramos
(74) *Attorney, Agent, or Firm* — Leydig, Voit & Mayer, Ltd.

(57) ABSTRACT

A device for cutting a preferably thick-walled extruded pipe to length, has at least one cutting tool and a receiving unit for the cutting tool, wherein the cutting tool is movable radially with respect to the extension axis and is rotatable by a further means about the pipe to be cut to length, in order to cut the pipe to length. The receiving unit preferably has two toothed rods arranged in a block, wherein the first toothed rod is movable back and forth axially and the second toothed rod radially with respect to the extension axis, the axial movement is converted into a radial movement, and the cutting tool is arranged on the second toothed rod.

7 Claims, 2 Drawing Sheets

(51) Int. Cl.
*B29C 47/00* (2006.01)
*B26D 1/58* (2006.01)
*B26D 1/60* (2006.01)
*B26D 5/08* (2006.01)
*B29L 23/00* (2006.01)

(52) U.S. Cl.
CPC ...... *B29C 47/0023* (2013.01); *B29C 47/0066* (2013.01); *B29C 47/003* (2013.01); *B29C 2793/0027* (2013.01); *B29L 2023/22* (2013.01)

(58) Field of Classification Search
CPC ......... Y10T 82/16754; Y10T 82/16803; Y10T 82/16819; Y10T 82/16951; Y10T 82/22; Y10T 82/2522; Y10T 82/2527
See application file for complete search history.

(56) References Cited

U.S. PATENT DOCUMENTS

| | | | | |
|---|---|---|---|---|
| 4,748,881 | A | * | 6/1988 | Keeling ............. B26D 1/18 82/49 |
| 5,394,776 | A | * | 3/1995 | Robinson ............ B23B 41/00 30/95 |
| 5,609,081 | A | | 3/1997 | Lin |
| 5,954,462 | A | * | 9/1999 | Way .................. B23B 5/162 408/153 |
| 2005/0169722 | A1 | * | 8/2005 | Esser ................. B23B 29/24 409/65 |

\* cited by examiner

DEVICE FOR CUTTING EXTRUDED PLASTICS PROFILES TO LENGTH

CROSS-REFERENCE TO RELATED APPLICATIONS

This application is a U.S. national stage application under 35 U.S.C. § 371 of International Application No. PCT/EP2014/071806, filed on Oct. 10, 2014, and claims benefit to German Patent Application No. DE 10 2013 220 617.8, filed on Oct. 12, 2013. The International Application was published in German on Apr. 16, 2015, as WO 2015/052329 A1 under PCT Article 21(2).

FIELD

The invention relates to a device for cutting to length an extruded tube that preferably has thick walls.

BACKGROUND

In order to cut to length extruded tubes, what are known as flying saws are usually used, a circular saw blade being brought towards the tube to be sawed from below (underfloor saw), from above (plunge saw), or from the side (crosscut saw), plunging into the cross section of the tube, and cutting through the wall thickness in a first step. In a second step, the saw blade is guided around the tube in order to fully cut the tube to length. In this case, the tube that is to be cut to length is clamped during the sawing process. The saw carriage then moves at the extrusion speed synchronously with the continuously progressing extrusion process ("flying saw").

When tubes are sawed, sawdust is produced. In addition, a static charge is generated due to the friction of the saw blade on the tube, in particular in the case of a plastics tube. This is disadvantageous in that the sawdust adheres to the tube, resulting in contamination. The waste material produced often has to be declared as hazardous waste, meaning that it cannot be recycled.

A device in which tubes are cut to length in a chipless manner is already used for small tubes. Rather than a running saw, a round knife is guided around the tube until the tube wall has been cut through.

The chipless cutting just mentioned makes it possible to cleanly cut small tube diameters having a thin cross section, but it has hitherto not been successful in also cutting to length thick-walled tubes having large or very large diameters, i.e. diameters of approximately 2 m. For these tubes, recourse is always made to the saws mentioned further up, resulting in the known disadvantages.

Tests have shown that the main problem lies in precisely guiding the knives through the thick-walled tube. On account of the large thickness and the large diameter, even at the smallest inclination of the knife said knife is canted in the material, which results in the knife breaking.

For cutting units of this kind, the market requirements are for a high linear speed at short cutting lengths and the option of applying a chamfer, for example in sewage pipes made of PP/PVC. Although automatic cutting machines are known that can carry out the cutting process very rapidly, said machines usually have the disadvantage that they cannot produce chamfers or that they are not suitable for all types of plastics material. However, automatic cutting machines which can produce chamfers usually have a comparatively large saw carriage and are therefore slow. The time required to make a cut is thus very long.

In the current machines such as saws (flying saws), tubes having a wide range of diameters are cut through by a cutting knife arm or a saw arm moving around the tube. All the functions necessary for this purpose, such as moving the arm forward and back, clamping/releasing the tube, and the corresponding position feedback are installed on the disc rotating about the tube. For this purpose, slip rings are used for the electrical signals. The usual procedure is to use a dedicated slip ring channel for each signal respectively. The signals, and thus the available functions, are limited by the structural size in smaller machines and by the cost per slip ring.

A solution to the above-described problem is disclosed in DE 20 104 200, but does not yet provide satisfactory solutions.

SUMMARY

An aspect of the invention provides a device for cutting to length an extruded tube, the device comprising: a cutting tool; and a support unit for the cutting tool, wherein the cutting tool is radially movable with respect to an extrusion axis, wherein the cutting tool is further rotatable about the tube that is to be cut to length, in order to cut the tube to length, wherein the support unit a first rack and a second rack, arranged in a block, wherein the first rack is movable back and forth axially with respect to the extrusion axis, wherein the second rack is movable back and forth radially with respect to the extrusion axis, wherein the axial movement is converted into a radial movement, and wherein the cutting tool is arranged on the second rack.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention relates to a device for cutting to length an extruded tube that preferably has thick walls, comprising at least one cutting tool and a support unit for the cutting tool, the cutting tool being radially movable with respect to the extrusion axis and being rotatable by further means about the tube that is to be cut to length in order to cut the tube to length.

An aspect of the invention develops the known specialized knowledge about a generic cutting device provided with a knife, such that it is possible to achieve a consistent cutting process, the knife being advanced in such a way that canting is prevented and as few components as possible are required.

An aspect of the invention is characterized in that the support unit comprises two racks arranged in a block, the first rack being movable back and forth axially with respect to the extrusion axis and the second rack being movable back and forth radially with respect to the extrusion axis, the axial movement being converted into a radial movement, and the cutting tool being arranged on the second rack.

This design of the device ensures an even, straight movement. The axial and radial movement of the cutting device along the extrusion axis can thus be combined in one drive.

According to a development, it is provided for the racks to be driven by means of a single axial drive. As a result, both installation space and material are saved, meaning that the entire device can be built so as to be smaller.

Advantageously, the racks are coupled in the block. As a result, the path of the first rack corresponds to the path of the second rack. The paths travelled by the racks are exactly synchronous. After appropriately adjusting the racks, it is ensured that the penetration depth of the cutting device into the outer wall of the plastics profile is virtually identical for all the cutting devices arranged over the periphery. Differences can occur only on account of tolerances in the profile section.

According to a further development, it is provided for the cutting tool to be a blade or a tool for chamfering the edges. Depending on the desired use, either the extruded profile can be cut through, or a chamfer can be produced on the front end of the tube. It is also conceivable to design a cutting tool to comprise both cutting to length and chamfering.

In a further development, it is provided for the block comprising the racks to be arranged on a support disc, the first rack being connected to an annular element that is movable back and forth along the extrusion axis on a sleeve. The support disc is rotated about the extruded tube by means of a drive. A plurality of units of the block comprising the racks can be arranged on the support disc, as a result of which the required rotation about the profile and/or the time required for cutting or chamfering is/are reduced.

Figure 1:
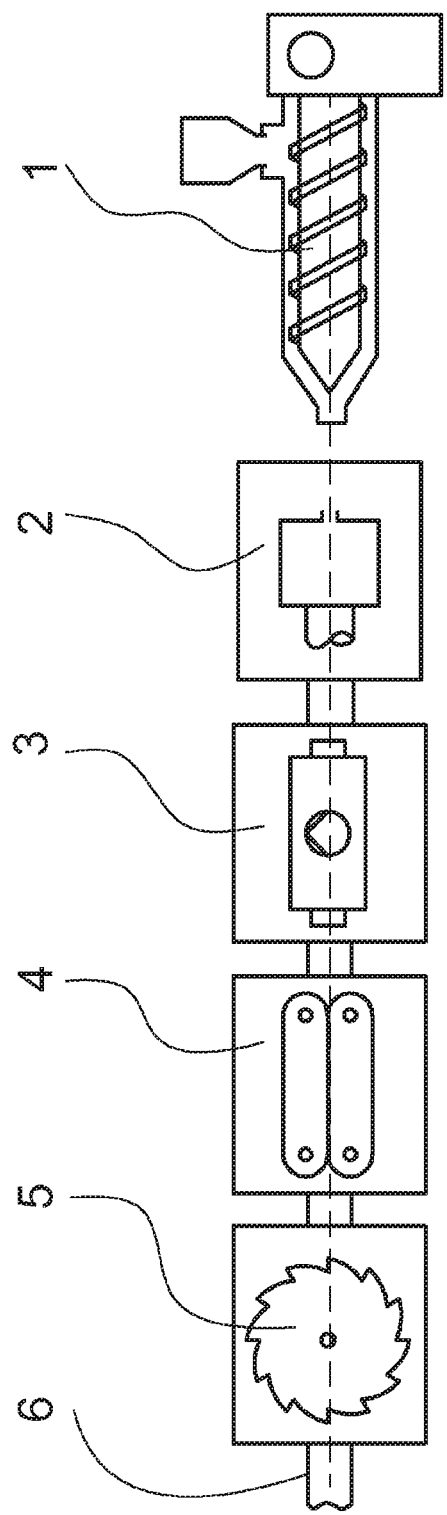
FIG. 1 shows a typical extrusion line.

FIG. 1 shows a typical extrusion line as used currently for profile extrusion, regardless of whether said line is used for producing window profiles or tubes. The figure shows an extruder 1, in which plastics material is melted and continuously conveyed into the extrusion die 2 to be shaped. The die is followed by a calibrating and cooling station 3; depending on the profile, further cooling stations can be used. Downstream of the cooling stations is a take-off device 4. A cutting device 5 is arranged thereafter for cutting the continuous profiles 6 to the desired length.

Figure 2:
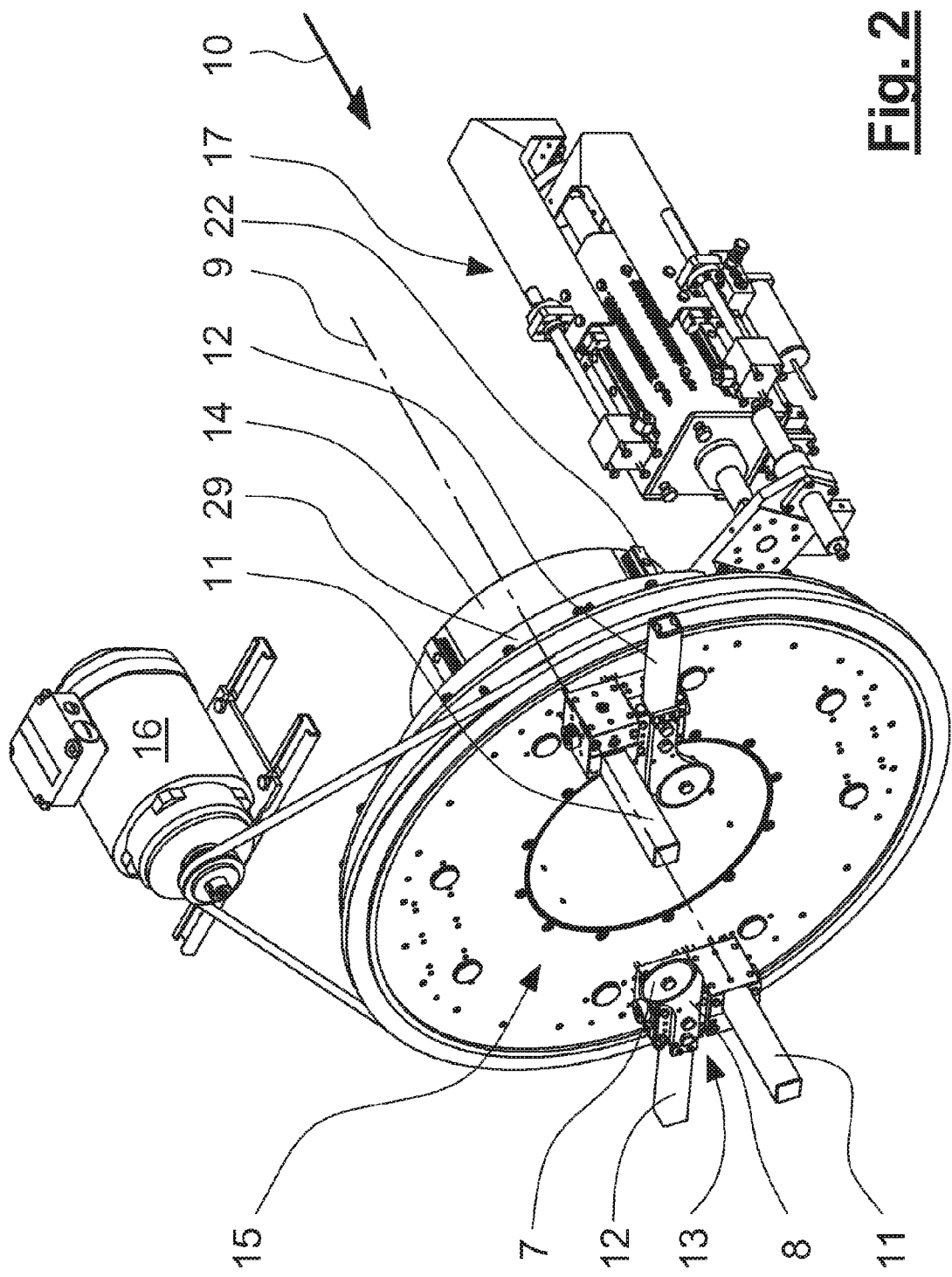
FIG. 2 shows the part of the cutting device.

FIG. 2 is a schematic view of the cutting device according to the invention, and corresponds to position 5 according to the view in FIG. 1. The actual cutting device 7 is arranged on a support unit 8 and can be screwed, clamped or fastened in another manner. A circular blade is used in the embodiment shown. However, this could also be a die, by means of which a chamfer can be produced. The support unit 8 is in turn arranged on a second rack 12 that is operatively connected to a first rack 11 by means of a block 13. The block 13 is arranged on a support disc 15 that can be rotated about the extrusion axis 9 by means of the rotary drive 16.

This axial drive 17 converts the movement of the two racks 11, 12 via the block 13, meaning that just one drive is required for the axial and the radial movement of the cutting knife. The coupling in the block 13 converts the axial movement into a radial movement, and the radial movement functions as the cutting movement for the cutting device.

A plurality of the blocks 13 comprising the racks can be arranged on the support disc 15 (just two are shown here by way of example), which blocks are arranged such that an imaginary straight connecting line radially intersects the two midpoints of the cutting tool 7 and the extrusion axis 9.

Furthermore, an annular element 29 is provided which is operatively connected to the first rack 11 and is movable back and forth along the linear guides 22 on the sleeve 14. The annular element 29 is equidistant from the sleeve 14 and is moved along the extrusion axis 9 by means of the axial drive 17. The tube/profile 6 (not shown) is moved in the extrusion direction 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

1 Extruder
2 Extrusion die
3 Calibrating and cooling tank
4 Take-off device
5 Cutting device
6 Profile
7 Cutting tool
8 Support unit for 7
9 Extrusion axis
10 Extrusion direction
11 first rack (parallel)
12 second rack (radial)
13 Block
14 Sleeve
15 Support disc
16 Rotary drive for 15
17 Axial drive for 29
22 Linear guide
29 Annular element

The invention claimed is:

1. A device for cutting to length an extruded tube that is extruded along an extrusion axis, the device comprising:
 a cutting tool;
 a support unit for the cutting tool, the cutting tool being arranged on the support unit so as to be directly disposed on the support unit; and
 a first rack and a second rack, arranged in a block, the support unit being arranged on the second rack so as to be directly disposed on the second rack, the first and second racks being coupled in the block, wherein the first rack is movable back and forth axially with respect to the extrusion axis so as to provide an axial movement, wherein the axial movement is converted into a radial movement such that the second rack is movable back and forth radially with respect to the extrusion axis such that the cutting tool is radially movable with respect to the extrusion axis, and wherein the cutting tool is rotatable about the extruded tube.

2. The device of claim 1, wherein the first and second racks are driven using a single axial drive.

3. The device of claim 2, wherein a path travelled by the first rack corresponds to a path travelled by the second rack.

4. The device of claim 1, wherein the cutting tool comprises a blade.

5. The device of claim 1, wherein the cutting tool comprises a tool configured to chamfer edges of the extruded tube.

6. The device of claim 1, further comprising a support disc and an annular element that is movable back and forth along the extrusion axis on a sleeve, wherein the block is arranged on the support disc so as to be directly disposed on the support disc, and wherein the first rack is connected to the annular element.

7. The device of claim 6, comprising:

a plurality of units of the block including the racks, each of the plurality of units of the block being arranged on the support disc so as to be directly disposed on the support disc.

* * * * *